J. C. GORDON.
DOUGH MIXING MACHINE.
APPLICATION FILED JULY 12, 1915.
1,187,521.
Patented June 20, 1916.
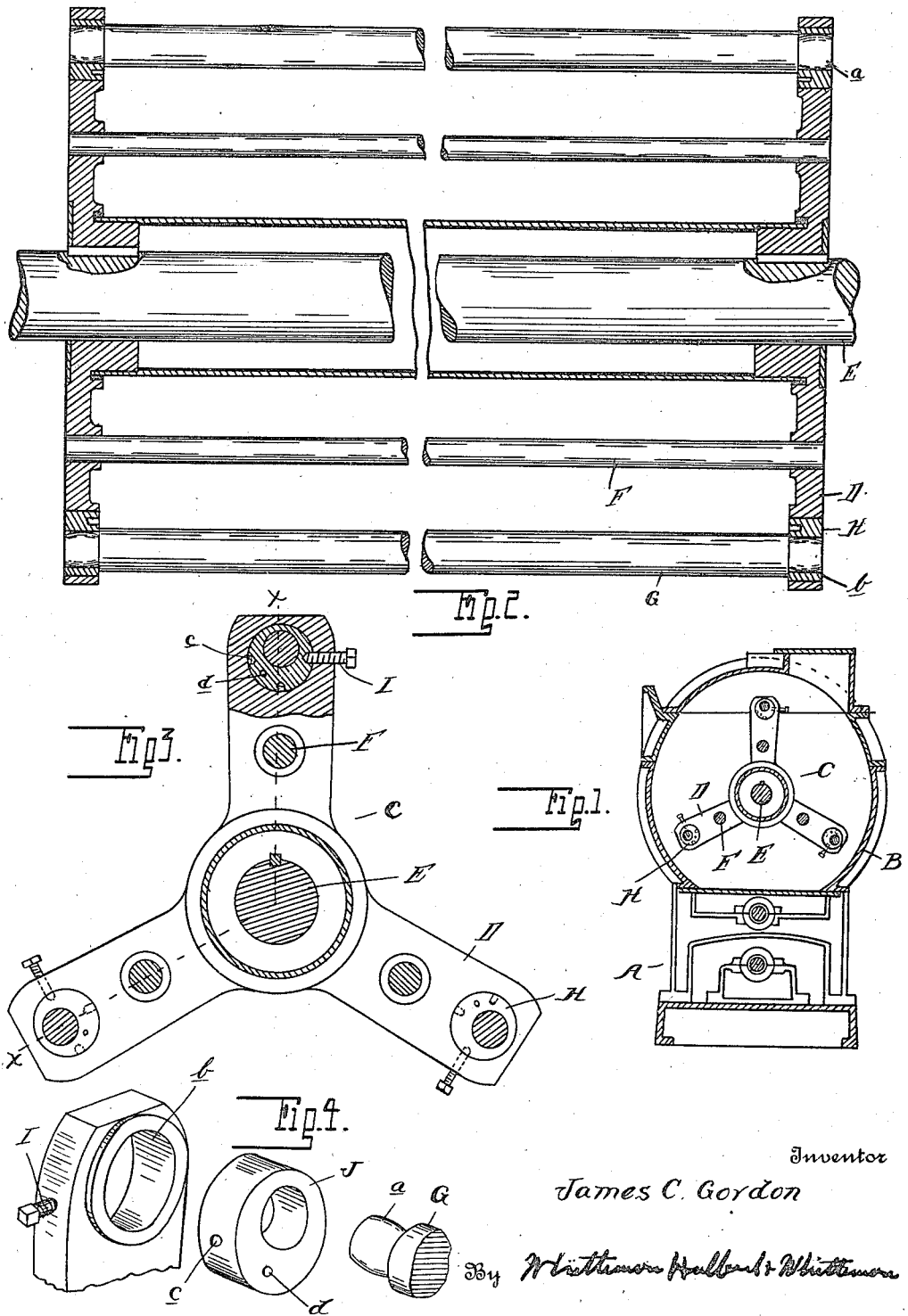
Inventor
James C. Gordon

UNITED STATES PATENT OFFICE.

JAMES C. GORDON, OF DETROIT, MICHIGAN.

DOUGH-MIXING MACHINE.

1,187,521.  Specification of Letters Patent.  Patented June 20, 1916.

Application filed July 12, 1915. Serial No. 39,236.

*To all whom it may concern:*

Be it known that I, JAMES C. GORDON, a citizen of the United States of America, residing at Detroit, in the county of Wayne and State of Michigan, have invented certain new and useful Improvements in Dough-Mixing Machines, of which the following is a specification, reference being had therein to the accompanying drawings.

The invention relates generally to dough mixing machines, and particularly to the dough manipulating devices, and is applicable to all machines of this character wherein a rotary dough kneading member is employed.

For convenience of illustration, I have shown the invention as embodied in a mixer of the rolling or kneading type set forth in Letters Patent of the United States numbered 1,134,328, issued to me under date of April 6, 1915, wherein rolls operating about a common center serve upon operation to manipulate the dough by a kneading movement, as distinguished from a shredding or tearing action.

The primary object of the invention is to provide a mixer capable of properly working or manipulating doughs of varying stiffness without injury or destructive action, which purpose is accomplished through the medium of adjusting mechanism; and the invention resides in adjusting means whereby the space between the mixer proper and the casing may be varied according to the stiffness of the dough to be manipulated.

In the drawings illustrating the invention, Figure 1 is a view in sectional elevation of a dough mixer embodying my invention; Fig. 2 is a section on line $x$—$x$ of Fig. 3; Fig. 3 is an enlarged sectional view of the dough manipulating device; and Fig. 4 is a view, in perspective, of the adjusting means.

In general, the dough mixing machine comprises a base section A, a cylindrical inclosing casing B, and a dough manipulating device C, the latter comprising radial arms D mounted upon a suitable rotary shaft E, and connected by an inner set of cross-bars F and an outer series of bars G. The latter bars are preferably in the form of rollers, the extremities of each being reduced to form journals, as $a$, mounted in adjustable supports H carried by the radial arms. These supports are preferably circular in cross section, adapted to be fitted within circular openings $b$ formed in the arm ends, and are retained in place against endwise movement by suitable set-screws or bolts I carried by the arms. Each support has formed within it an eccentric bearing J to receive the reduced end of the manipulating member, and is retained in different positions within the arm opening, as well as being held against endwise movement, through the agency of a plurality of openings $c$ formed within the periphery of the support, adapted to receive the locking bolt I.

$d$ represents a depression formed in the face of each support adapted to receive a suitable tool for shifting the support into different positions of adjustment.

From the foregoing description, it will be obvious that the outer bars or dough manipulating devices may be brought nearer to or shifted farther away from the working surface of the casing by proper rotary adjustment of its supports, and that it may be held in any desired position through the medium of the locking devices described. In this manner, the space between the mixer proper and the casing may be varied, as desired, or found necessary by reason of the stiffness of the dough that is to be worked, and the latter in this way kneaded or rolled upon the working surface without injury or destructive action.

What I claim as my invention is,—

1. A dough manipulating machine, comprising a surface member, a dough manipulating member having the nature of a roll revoluble through an orbit distant from the surface member, and having its axis parallel to that of said orbit, and means for adjusting one of the members to vary the distance between said orbit of movement and the surface member.

2. A dough manipulating machine, comprising a curved working surface, a dough manipulating member revoluble through an orbit spaced from said surface, supporting means for said member, and means for adjusting the manipulating member while engaged with said supporting means to vary the distance between the orbit and said working surface.

3. A dough manipulating machine, comprising a curved working surface, a roll revoluble about its axis, means for carrying the roll through an orbit spaced from said surface, and means for adjusting the roll to vary its orbit of movement.

4. A dough manipulating machine, comprising a receptacle, a dough manipulating device rotatably mounted therein including spaced supporting arms, and a dough kneading member carried by said arms, and means for radially adjusting said member while engaged with said arms and for holding it adjusted.

5. In a dough manipulating machine, the combination with a cylindrical casing, of a rotary dough manipulating device therein having spaced radial arms, roll supports upon the arms mounted for rotative adjustment, and a roll having eccentric bearings in the supports.

6. A dough-manipulating machine, comprising a member providing a working surface, a member revoluble through an orbit spaced from said working surface, a bearing mounted for rotative adjustment in the revoluble member, and a roll eccentrically mounted in the bearing and displaceable to and from the working surface through said adjustability of the bearing.

In testimony whereof I affix my signature in presence of two witnesses.

JAMES C. GORDON.

Witnesses:
   JAMES P. BARRY,
   PHYLLIS COBURN.